(12) United States Patent
Staudigel et al.

(10) Patent No.: US 6,416,230 B1
(45) Date of Patent: Jul. 9, 2002

(54) SNAP CAGE FOR BALL BEARINGS

(75) Inventors: Erwin Staudigel; Albert Staudigel, both of Höchstadt/Aisch; Werner Pest, Hallendorf; Alfons Gerner, Pommersfelden; Herbert Rost; Herbert Zettner, both of Herzogenaurach, all of (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/609,738

(22) Filed: Jul. 5, 2000

(30) Foreign Application Priority Data

Aug. 10, 1999 (DE) .......................................... 199 37 664

(51) Int. Cl.⁷ ............................ F16C 33/41; F16C 33/66
(52) U.S. Cl. ...................... 384/523; 384/470; 384/531
(58) Field of Search ................................ 384/470, 523, 384/526, 527, 531

(56) References Cited

U.S. PATENT DOCUMENTS

| 3,749,461 A | | 7/1973 | Liss et al. .................... 384/527 |
| 4,136,915 A | * | 1/1979 | Derner ........................ 384/526 |
| 4,149,760 A | * | 4/1979 | Guenther ..................... 384/526 |
| 6,068,408 A | * | 5/2000 | Mutoh et al. ................ 384/523 |
| 6,074,099 A | * | 6/2000 | Mutou et al. ................ 384/533 |

FOREIGN PATENT DOCUMENTS

| DE | DE-GM 19 10 797 | 2/1965 |
| GB | 23 06 582 A | 5/1997 |
| GB | 23 20 744 A | 7/1998 |
| JP | 09144762 A | 6/1997 |
| JP | 09177790 A | 7/1997 |
| JP | 10082424 A | 3/1998 |
| JP | 11182554 A | 7/1999 |

OTHER PUBLICATIONS

TADIC, Vedran: Technische Kunststoffe für Käfige "nach Mass". In: Evoluton, Jan. 1998, p. 27, 28, 29.

* cited by examiner

Primary Examiner—Thomas R. Hannon
(74) Attorney, Agent, or Firm—Henry M. Feiereisen

(57) ABSTRACT

A plastic snap cage for radial ball bearings includes thin-walled cup-like pocket elements spaced about the circumference and connected with each other in one piece through ribs, thereby forming pockets that are open in the axial direction to receive the balls. The radially inwardly and/or the radially outwardly extending boundary edge of the pockets is rounded in accordance with a selected rounding radius R.

4 Claims, 4 Drawing Sheets

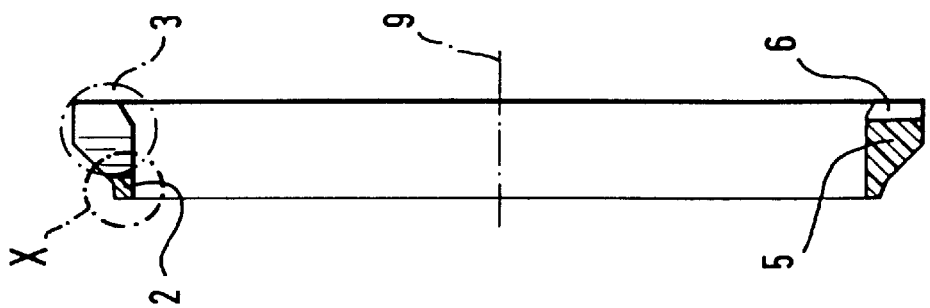
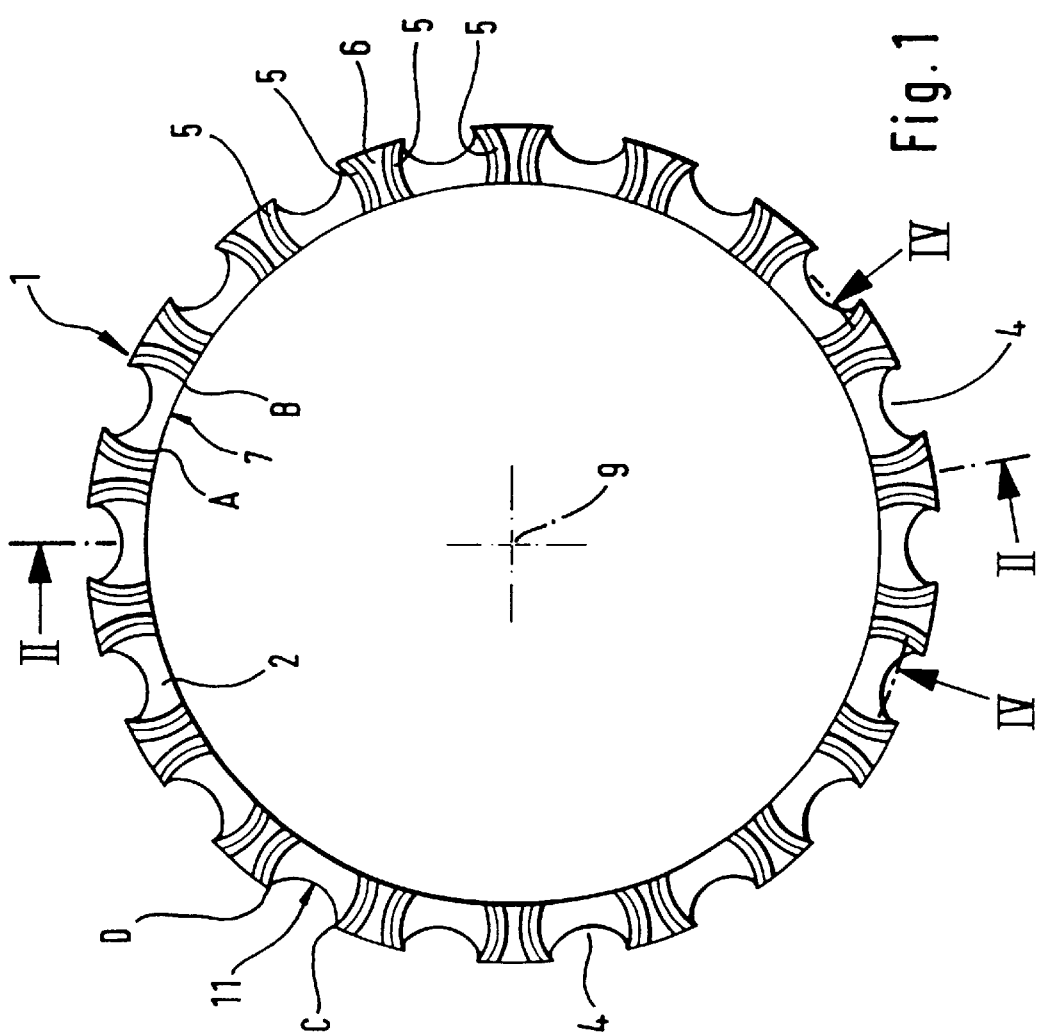

SNAP CAGE FOR BALL BEARINGS

FIELD OF THE INVENTION

The invention relates to a plastic snap cage for radial ball bearings which includes of thin-walled cup-like pocket elements that are distributed about the circumference, with the pocket elements being connected with each other by ribs to form a single piece. The so formed pockets are open in the axial direction to accept the balls.

BACKGROUND OF THE INVENTION

Various designs of snap cages for ball bearings, which are cages with pockets that have lateral openings in the axial direction, are known in the art. Typically, snap cages have a continuous solid side ring on one side and cup-like pocket elements with slots or openings between the pockets on the other side. These pocket elements can yield elastically, allowing the bearing balls to be easily snapped into position.

A snap cage of this type for balls is known, for example, from the German utility model application DE-GM 19 10 797. The cage disclosed therein includes thin-wall, cup-like pocket elements, also referred to as guide cups, which are open on one side in the axial direction, and ribs that connect these guide cups.

These cages disadvantageously tend to have sharp transitions and are therefore easily nicked, i.e., they can break. As another disadvantage, the sharp edges of the cage that surround the bearing balls tend to disrupt the lubricating film that adheres to the bearing balls.

SUMMARY OF THE INVENTION

It is therefore an object of the invention to provide a cage of this type which is less susceptible to breakage and at the same time improves the operation of the ball bearing.

The object is solved according to the invention in that at least the radially inwardly and/or the radially outwardly extending boundary edges of the pockets are rounded in accordance with a selected rounding radius R.

The proposed design of the snap cage in accordance with the invention firstly improves the tribological conditions in the ball bearing since the rounded boundary edges of the pockets have less of a detrimental effect on the lubricating film that adheres to the bearing balls than sharp boundary edges. Secondly, the ball bearing is easier to assemble because the bearing balls can be resiliently inserted in the cage not only, as up to now, in the axial direction, but also in the radial direction either from above downwardly or from below upwardly. Thirdly, rounding of the boundary edges advantageously also reduces the risk of breakage considerably, in particular for small filigree cages. Finally and fourthly, the cage can advantageously be manufactured with a higher surface quality which makes it easier to assemble the bearing.

According to another feature of the present invention the boundary edges of the pockets that are disposed along the circumference and face each other may be rounded. The rounded edges allow the pockets that are open in one direction to yieldably deflect in the axial direction.

According to another feature of the present invention, the rounding radius should be ±0.05 mm. This is the smallest possible radius. The magnitude of the radius, however, depends on the available installation space, the diameter of the balls and the type of guidance of the cage. Rounding radii in the range of several millimeters are also feasible.

According to another feature of the invention, the snap cage can be packed with a filler material and/or made of a glass fiber reinforced polyamide (PA). Typical filler materials known in the art are to be understood broadly as including additives of various structures which provide the cage with the desired properties and thus enhance the performance of the roller bearing, for example, fibers of all types, glass spheres, but also graphite or molybdenum sulfide. Polyamides are thermoplastic materials known to those skilled in the art due to their advantageous mechanical properties. More specifically, polyamides retain their shape at elevated temperatures and are very resistant to fuel and lubricants. The mechanical properties can be further improved by adding glass fibers, thereby increasing both the rigidity and the softening temperature.

The invention will now be described in detail with reference to the following embodiments.

BRIEF DESCRIPTION OF THE DRAWINGS

It is shown in:

FIG. 1 a side view of a spherical snap cage according to the invention;

FIG. 2 a section along the line II—II of FIG. 1;

DETAILED DESCRIPTION OF THE DRAWINGS

Figure 3:
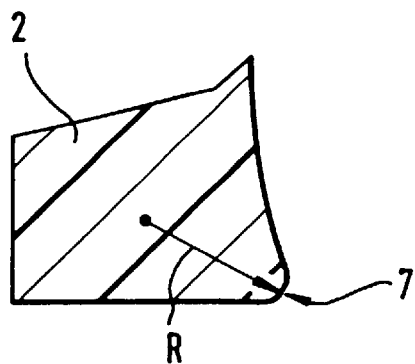
FIG. 3 an enlarged detail X of FIG. 2.

The snap cage 1 depicted in FIGS. 1 to 5 is made of a glass fiber reinforced polyamide (PA 66-GF25), with the left side of the snap cage 1 including a continuous solid rib 2 for interconnecting pockets 4 to receive bearing balls 3. The pockets 4 are open in one side in the direction of the rotation axis 9 and include cup-like pocket elements 5 that envelop the bearing balls 3 on both sides. Free spaces 6 disposed between two adjacent cup-like pocket elements 5 enhance the flexibility of the elements 5. An enlarged view of the detail X of FIG. 2 is shown in FIG. 3. As seen in the case involved here, the radially inwardly extending boundary edge 7 of the pockets 4, which, according to FIGS. 1, 4 and 5, extends from point A to point B, is rounded in correspondence with the selected rounding radius R. The radially outwardly extending boundary edge 11, extending from point C to point D, is not rounded.

Figure 4:
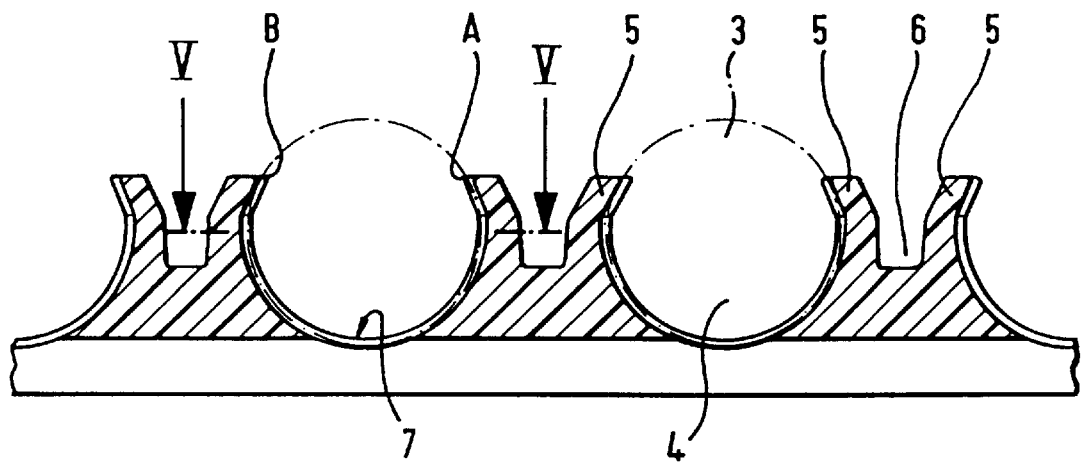
FIG. 4 a section along the line IV—IV of FIG. 1.
Figure 5:
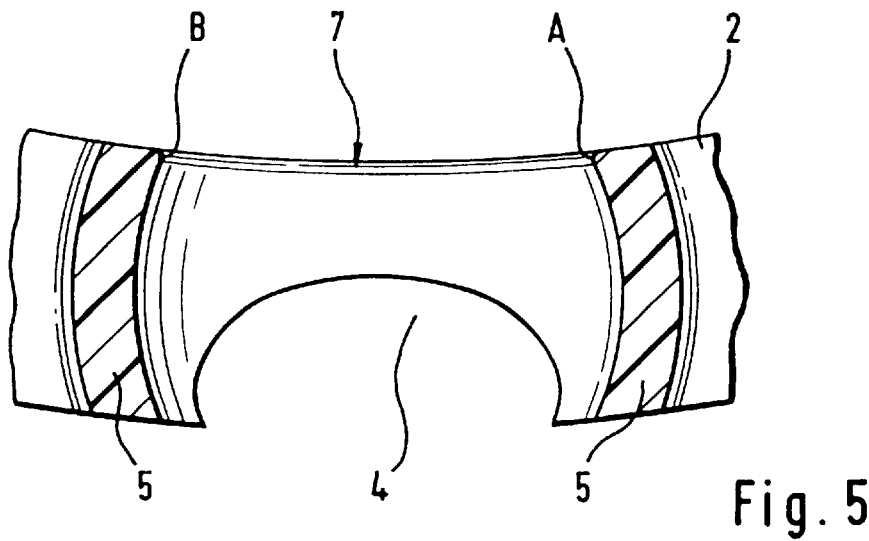
FIG. 5 a section along the line V—V of FIG. 4.
Figure 6:
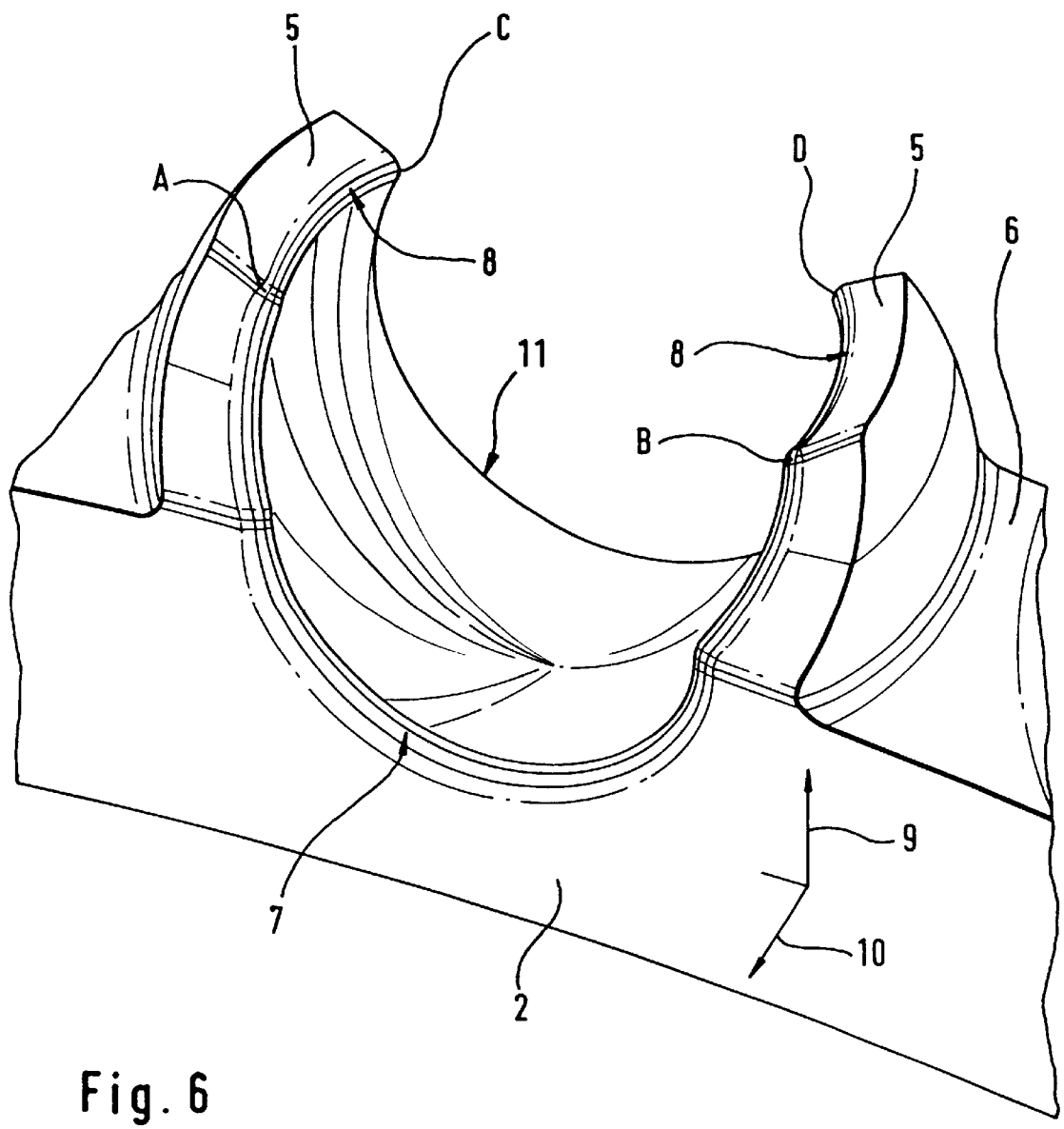
FIG. 6 a three-dimensional representation of a cage according to the invention.

As seen in the developed view shown in FIG. 4, the inner boundary edge 7 of the pocket 4 extends from point A of the one cup-like pocket element 5 to point B of the neighboring cup-like pocket element 5 and envelops the bearing ball 3 at an angle of approximately 240°. As shown in FIG. 6, in addition to the rounded lower boundary edge 7, the snap cage 1 can be designed to have two additional rounded boundary edges 8 which confront one another in circumferential direction and extend from point A to point C and from point B to point D, respectively. This permits that bearing balls 3 can be inserted in the pockets 4 not only in the direction of the rotation axis 9, but also from the inside to the outside in the direction of the axis 10. The radially outwardly extending boundary edge 11, which extends from point C to point D, is formed with a sharp edge.

Figure 7:
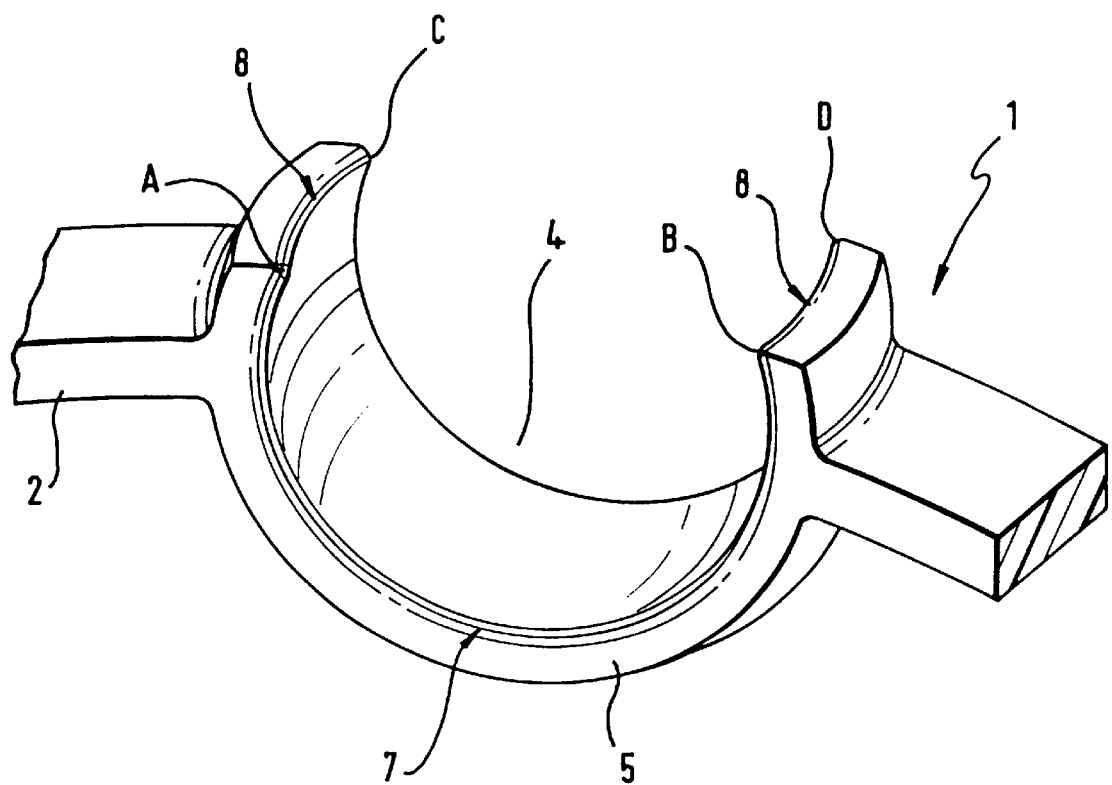
FIG. 7 a perspective view of a portion of such a cage.

The perspective view of a portion of a snap cage 1 according to the invention shown in FIG. 7 once again includes cup-like pocket elements 5 which are connected with one another in single piece configuration by ribs 2 so that the bearing balls (not shown) are retained in pockets 4. However, unlike the cage depicted in FIGS. 1 to 5, the rib 2 is not formed as a continuous piece. The snap cage 1 has again rounded boundary edges 7 and 8, with the radially inwardly oriented boundary edge 7 extending from point A to point B, and the boundary edges, which face each other in circumferential direction, extending from point A to point C and from point B to point D, respectively.

What is claimed is:

1. A plastic snap cage for a radial ball bearing, comprising a plurality of thin-walled cup-shaped pockets connected with one another through ribs to form a single piece body with circumferentially spaced pockets which are open in an axial direction for receiving balls of the ball bearing, wherein the pockets have radially inwardly extending and radially outwardly extending boundary edges, at least one of the radially inwardly extending and radially outward boundary edges of the pockets being rounded along the entire length of the boundary edge in accordance with a selected rounding radius, and wherein the pockets include at least two additional rounded boundary edges confronting each other in circumferential direction.

2. The plastic snap cage according to claim 1, wherein the rounding radius is equal to or greater than 0.05 mm.

3. The plastic snap cage according to claim 1, wherein the body contains filling material.

4. The plastic snap cage according to claim 1, wherein the body is made of a glass fiber reinforced polyamide (PA).

\* \* \* \* \*